United States Patent [19]

Cole et al.

[11] Patent Number: 4,517,826
[45] Date of Patent: May 21, 1985

[54] APPARATUS AND METHOD FOR DETERMINING THE AIR LEAKAGE CHARACTERISTICS OF A STRUCTURE

[75] Inventors: Charles Cole; Wayne Cole, both of Winnipeg, Canada

[73] Assignee: Enercorp Management, Ltd., Winnipeg, Canada

[21] Appl. No.: 373,971

[22] Filed: May 3, 1982

[30] Foreign Application Priority Data

Jul. 17, 1981 [CA] Canada ................................. 381943

[51] Int. Cl.³ ............................................. G01M 3/26
[52] U.S. Cl. ...................................................... 73/40
[58] Field of Search ............................................. 73/40

[56] References Cited

U.S. PATENT DOCUMENTS 3,807,219 4/1974 Wallskog ................................. 73/40
3,918,291 11/1975 Pauly et al. ............................. 73/40
4,055,074 10/1977 Thimons et al. ........................ 73/40
4,114,424 9/1978 Johnson .................................. 73/40
4,363,236 12/1982 Meyers .................................... 73/40

FOREIGN PATENT DOCUMENTS 587509 11/1959 Canada .

OTHER PUBLICATIONS

Blomsterberg, A. K. et al., *Approaches to Evaluation of Air Infiltration Energy Losses in Buildings*, ASHRAE Transactions, vol. 85, part 1, 1979.
National Geographic Magazine, "Special Report in the Public Interest-Energy", Feb. 1981, pp. 48 and 49.

*Primary Examiner*—Gerald Goldberg
*Assistant Examiner*—Joseph W. Roskos
*Attorney, Agent, or Firm*—Abelman, Frayne, Rezac and Schwab

[57] ABSTRACT

An apparatus and method for measuring the air leakage rate of a structure, such as a building, for the purpose of assessing the need to add caulking, weatherstripping or the like to the building to minimize energy loss. The equipment includes a panel which may conveniently fit into a doorway or window frame of the building and seal the same against air leakage except for an air pathway passing through the panel. The pathway has a fan or the like for causing air to flow through the pathway, preferably from the inside to the outside to create a partial vacuum inside the building. Pressure sensors are provided to measure the partial vacuum and the air pressure inside the air pathway. From these measurements and a knowledge of the total internal volume of the building structure, the air leakage rate of the structure can be determined and expressed, for example, as a number of total volume changes per hour. The apparatus is portable and can be used for almost any building without structural modification.

20 Claims, 14 Drawing Figures

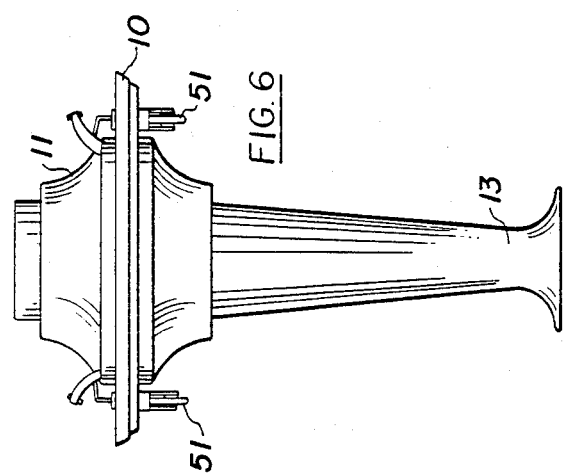
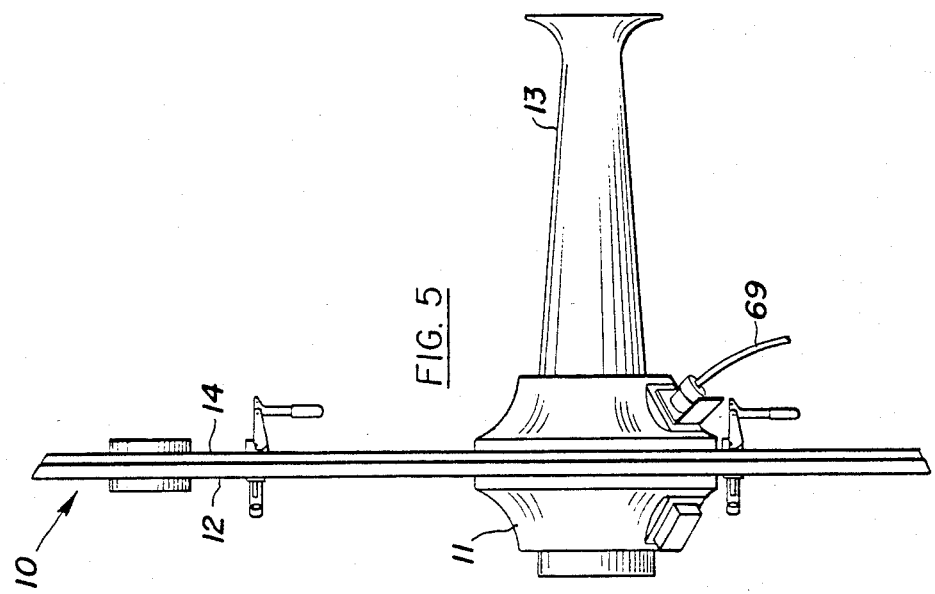

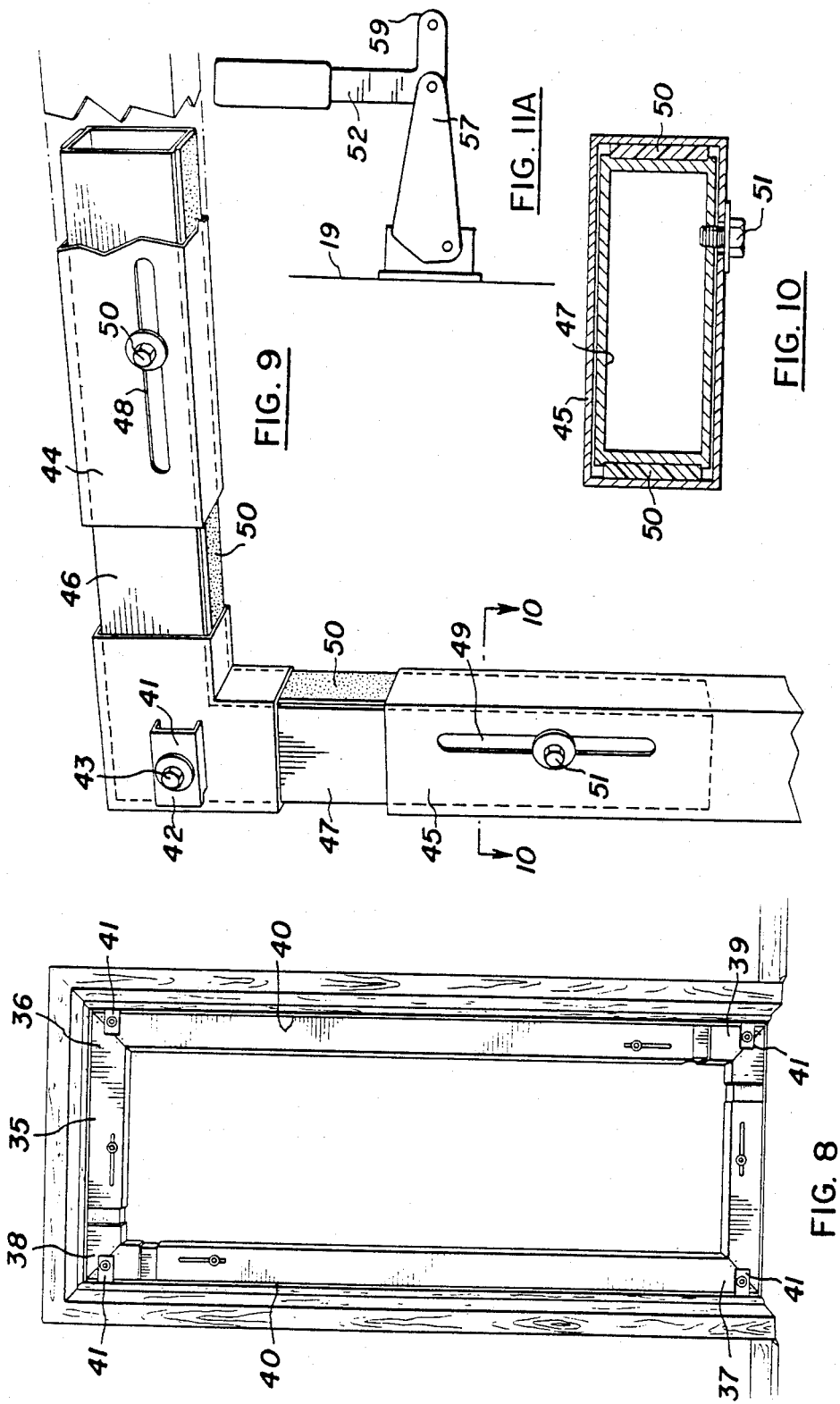

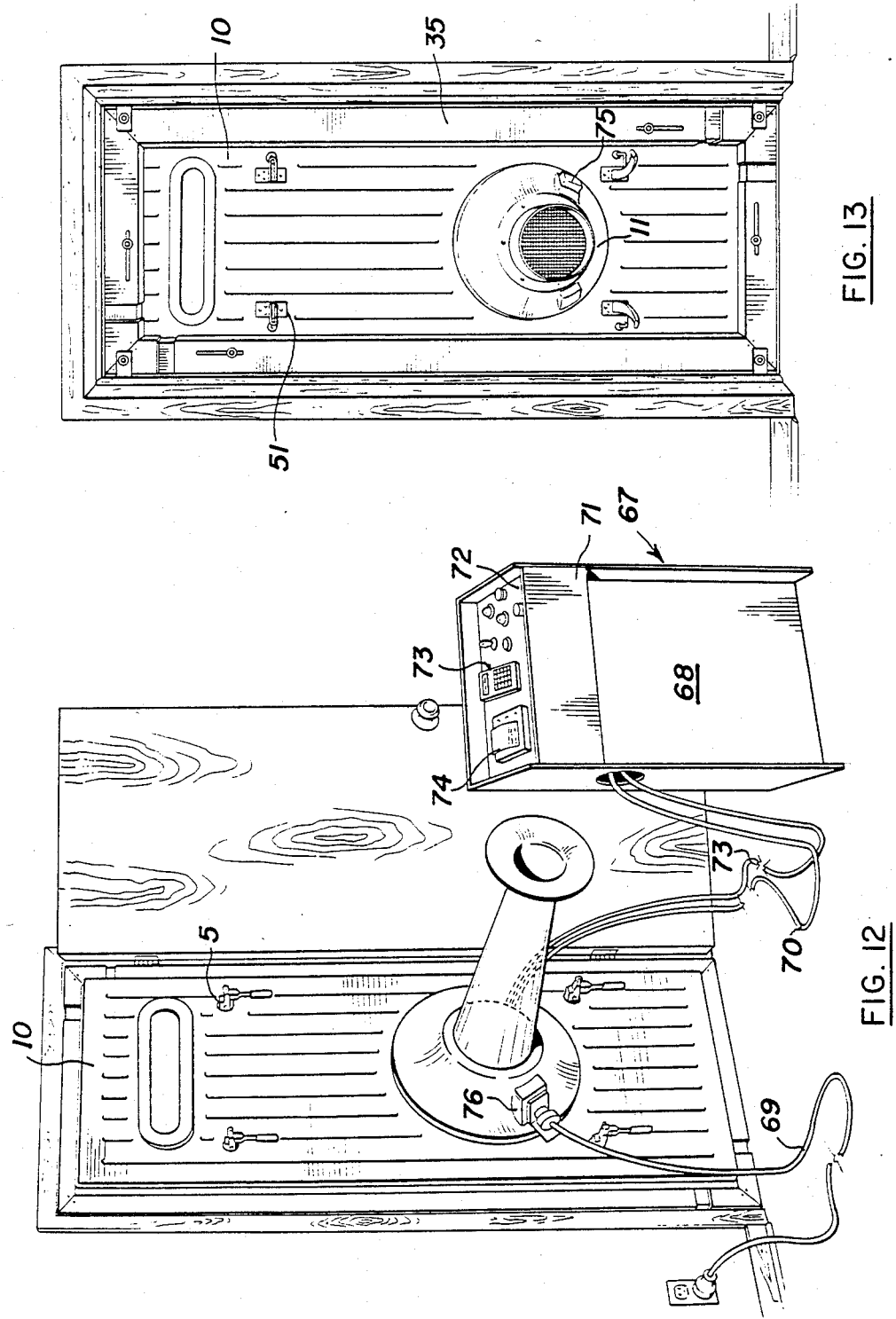

/ 1

APPARATUS AND METHOD FOR DETERMINING THE AIR LEAKAGE CHARACTERISTICS OF A STRUCTURE

BACKGROUND OF THE INVENTION (A) Field of the Invention

This invention relates to a method of and apparatus for measuring the air leakage rate of a structure, e.g. a building or a part thereof, for the purpose of assessing the efficiency of the structure in resisting energy loss.

(B) Description of the Prior Art

The ability of building structures to assist energy loss is nowadays of significant importance because of the very high cost of energy used for heating and cooling buildings. Much attention has been paid to increasing the insulation factors of walls and ceilings, but energy gains achieved by this means are minimized if the building has poor air tightness, as energy can escape around the insulation. It is therefore necessary to reduce air leaks by providing proper caulking, weather stripping, etc.

Until now, no convenient way has existed of measuring the air tightness of buildings with any degree of accuracy. Measurements have been made of test houses, for example, but the conventional equipment employed is extremely bulky, difficult to use and requires structural modification to the house. Further, measurements made for a test house cannot reliably be employed for other houses because individual houses, even if made from the same plans, may differ considerably in air tightness according to the degree of care taken by the builders in ensuring that joints and seals are formed properly.

There is therefore a need for convenient apparatus for measuring the air tightness of a structure which is sufficiently portable and adjustable that it can conveniently be used for most existing buildings without requiring significant structural modifications. Such equipment should enable the air tightness of the structure to be tested so that additional caulking, weather stripping and the like could be installed if required.

SUMMARY OF THE INVENTION

According to one aspect of the invention there is provided apparatus for measuring the air leakage of a structure comprising: means for sealing an opening in the structure except for an air passageway defined by said means; means for moving air through said passageway to create a pressure difference between the inside and outside of said structure; and means for assessing the volume of air passing through said passageway; wherein the means for sealing the opening in the structure comprises: an adjustable frame shaped to fit snugly within said opening at the periphery thereof, and a panel dimensioned to sealingly engage said frame to complete the closure of said opening.

According to another aspect of the invention there is provided a method of measuring the air leakage rate of a structure having an opening therein, comprising: sealing said opening against air leakage by means of an adjustable frame shaped to fit snugly within said opening at the periphery thereof and a panel dimensioned to sealingly engage said frame to complete the closure of said opening except for an air passageway defined therethrough; moving air through said passageway to create a difference in pressure between the inside and outside of said structure; and assessing the volume of air passing through said passageway.

Use is preferably made of an existing opening in the structure, e.g. a domestic house, such as a doorway or window frame. In this way, structural modification of the house is unnecessary.

To allow for differences in size between doorways or window frames, the means for sealing the opening preferably comprises two parts, i.e. an adjustable frame that can be dimensioned to fit snugly within the opening, and a panel for partially overlapping the frame at its periphery and thus completing the closure and sealing of the opening.

The panel defines an air passageway so that air may be moved from the inside of the building to the outside, or vice-versa. The air is preferably moved in this way by a motor-driven fan located within the passageway. It is most preferable to operate the equipment so that air is moved from the inside to the outside, thus producing a partial vacuum within the structure, but the reverse operation falls within the scope of this invention.

In the preferred embodiments, the panel has a pressure sensor for measuring the reduction of pressure within the structure and a further sensor for measuring the air pressure within the air passageway as an assessment of the volume of air passing therethrough. To obtain a reliable air pressure reading from within the air passageway, the latter is defined in part by a tubular projection from the panel. The projection has a flared end and smooth interior that results in stable, laminar flow of the air. The pressure readings are taken at a narrow point in the passageway defined adjacent the flared end of the tubular projection.

Advantageously, the pressure readings and desirably the house volume (measured manually) can be fed into a specially programmed calculator or computer so that the air leakage rate can be determined quickly and easily.

Special clamps have been invented to locate the panel within the frame and these clamps, as well as the panel and adjustable frames themselves, also form separate aspects of this invention.

BRIEF DESCRIPTION OF THE DRAWINGS

FIG. 5 is a side elevation of the panel;

FIG. 6 is a top plan view of the panel;

FIG. 8 is a perspective view of an adjustable frame forming another part of the apparatus, the frame being located in a doorway of a building;

FIG. 9 is a partial view on an enlarged scale of one corner of the frame shown in FIG. 8;

FIG. 10 is a cross-sectional view of the frame taken along the line 10—10 of FIG. 9;

FIG. 11A is a side elevational view of part of the apparatus shown in FIG. 11;

FIG. 12 is a perspective view of the panel, adjustable frame and control apparatus according to one embodiment of the invention;

FIG. 13 is a perspective view similar to FIG. 12 but from the opposite side of the doorway.

DESCRIPTION OF THE PREFERRED EMBODIMENTS

Figure 2:
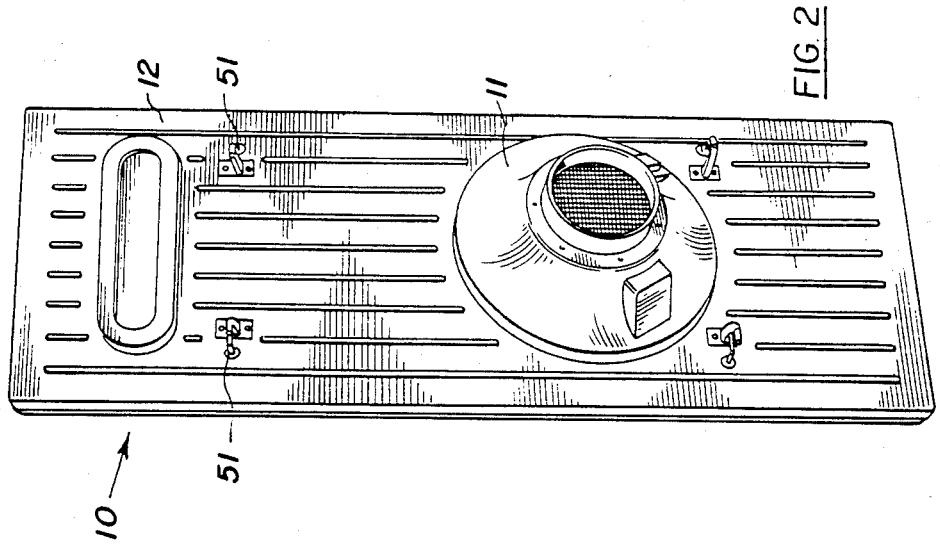
FIG. 2 is a perspective view of the opposite side of the panel shown in FIG. 1.
Figure 1:
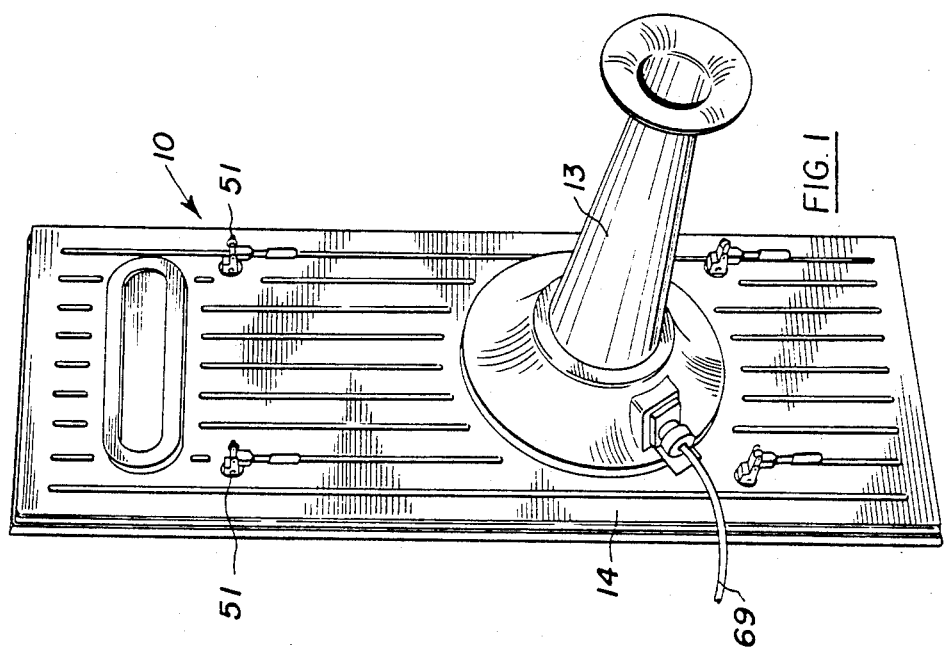
FIG. 1 is a perspective view of a panel forming part of the apparatus according to one embodiment of the invention.
Figure 4:
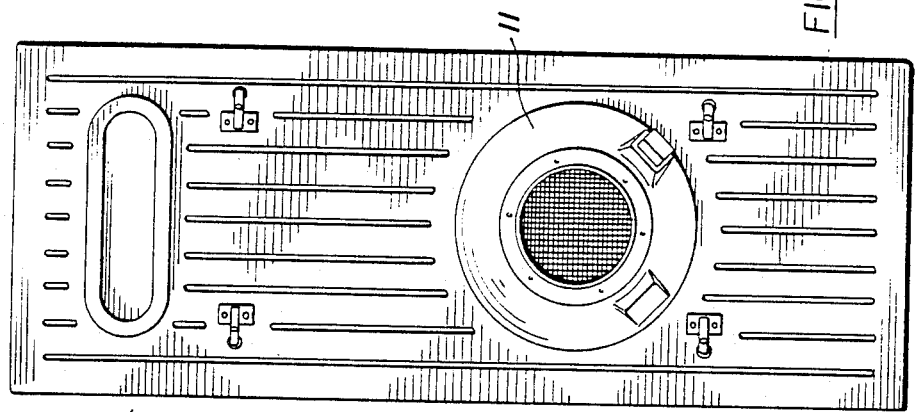
FIGS. 3 and 4 are front and rear elevations, respectively, of the panel shown in FIGS. 1 and 2.
Figure 3:
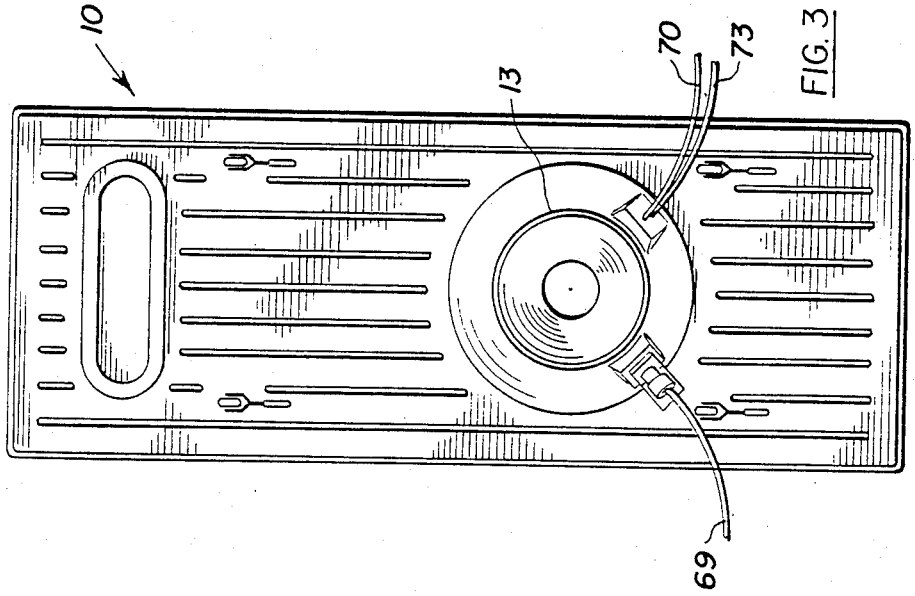
Figure 7:
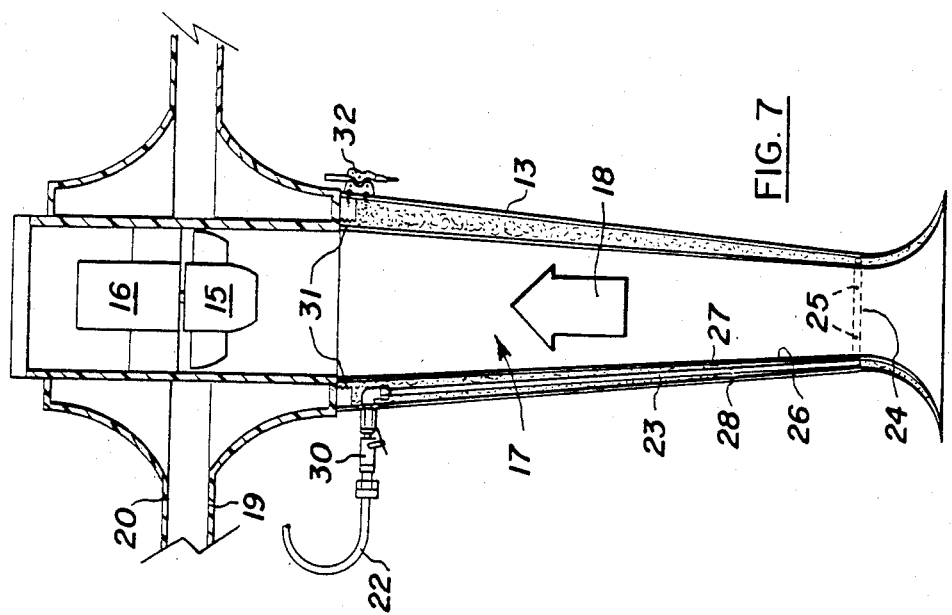
FIG. 7 is a cross sectional view of a part of the panel showing the air passageway and fan arrangement therein.

FIGS. 1 to 7 of the drawings show a panel 10 intended to be located within a door frame of a building in a manner to be described later.

The panel 10 has a short circular projection 11 on one surface 12 (referred to as the high pressure surface) and a long, tapering tubular projection 13 with a flared end on the opposite surface 14 (referred to as the low pressure surface). Together, the two projections 11 and 13 define a passageway 17 (see FIG. 7) passing completely through the panel so that air may pass from one side to the other. Located within the channel 17 is a fan 15 driven by an electric motor 16 for causing air to flow through the channel 17 in the direction of arrow 18. When the panel 10 is located within a doorway with the surface 14 facing inwards and the edges are sealed against escape of air (as described later), operation of the fan 15 causes air to be withdrawn from the building to create a partial vacuum inside. The air leakage of the building (e.g. expressed as complete air changes per hour at a predetermined vacuum, an equivalent leakage area or the relative tightness) can be calculated from measurements of the pressure differential between the inside and the outside, the pressure within the projection 13 and the total volume of the building (or part thereof) under test.

Figure 11:
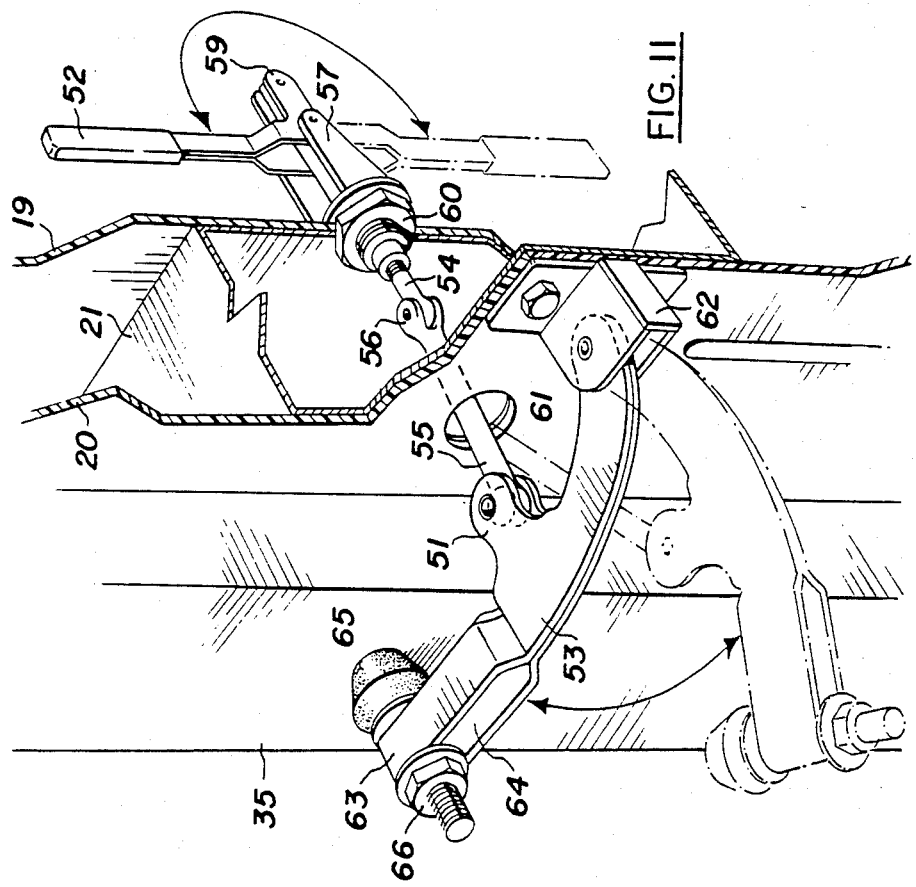
FIG. 11 is an enlarged view with parts cut away showing one of the clamps used to attach the panel to the adjustable frame.

The panel 10 has a hollow core for lightness and ease of manufacture and is formed of two flat sheets 19, 20 (see FIGS. 7 and 11), preferably of glass fibre reinforced plastic, spaced apart by a small distance and joined together at their peripheral edges. Box section reinforcements (e.g. as shown at 21 in FIG. 11) are provided within the panel for additional strength, particularly in those areas subject to stress resulting from the weight of the air channel assembly 11, 13, 15, 16 or the necessary clamping of the panel to be described later. The inner sheet 19 defining the low pressure surface 14 is impermeable to air to prevent air leakage when the apparatus is in use, but the outer sheet 20 may be perforated to allow the air pressure within the core of the panel to equalize to the air pressure outside the structure being tested.

The panel is provided with two pressure sensors not shown in the drawings. One of the sensors measures the difference in pressure on each side of the panel 10 (i.e. the reduction in pressure within the structure being tested) and the other measures the pressure within the projection 13. These sensors may be conventional manometers mounted on the panel and read by the operator, or they may alternatively be pressure transducers or air sensitive diaphragms coupled to strain gauges. The latter two types of sensor can generate an electrical signal that may be read directly by a calculator or computer supplied as part of the apparatus, thus making the taking of measurements entirely automatic.

The sensor used for measuring the difference in pressure on each side of the panel can be located at any convenient point on the panel. However, the part which senses the pressure outside the structure under test is preferably located within the hollow core of the panel 10 which, as stated above, communicates through perforations in the outer sheet 20 with the external atmosphere. In this way, the sensor is shielded from the wind or other air movements which could result in a false reading.

The sensor used for measuring the pressure within the projection 13 is connected to one end (not shown) of a pressure sensing tube 22, part of which 23 is buried in the wall of the projection 13 and extends axially lengthwise of the projection. The extreme end of the buried part 23 is formed as a circular tube 24 which surrounds the air channel 17 defined by the projection 13 at approximately its narrowest part. The circular tube 24 communicates with the air channel through four ports 25 (only two being shown in FIG. 7, the other two being positioned symmetrically). The inner surface 26 of the projection 13 is shaped and dimensioned in such a way that a smooth laminar flow of air takes place in the air channel 17 adjacent the ports 25. Such laminar flow causes a reduction of pressure within the tube 22 and the pressure reduction depends on the rate of flow of air through the tube.

The projection 13 is separable from the panel 10 to allow for ease of shipment and installation. The projection comprises inner and outer shells 27, 28 of glassfiber-reinforced plastic and a solid core 29 of foamed plastic material (e.g. polyurethane foam) which imparts rigidity without unacceptable weight. The tube 23 embedded in the foam core is preferably made of copper and is provided with an airtight coupling 30 at the point where the tube emerges from the projection 13 so that the tube may be easily attached to or detached from the remainder of the tube 22. The projection 13 itself is attached to the panel 10 by means of a screw thread 31 and/or clips e.g. the one shown at 32.

The inner contour of the projection 13 is generally critical only in that it should produce a relatively stable generally laminar flow in the region where the internal pressure is measured. A long, inwardly tapering nozzle with a flared end has been found best for this because the pressure can be measured at a substantial distance from the turbulent region of air around the fan 15, and at the narrowest part of the nozzle where pressure measurements are the most reliable. A standard ASME (American Society of Mechanical Engineers) calibrated long radius nozzle is suitable.

The pressure sensed at the throat of the projection 13 is proportional to the volume of air flowing through the projection according to the formula $Q = C(\Delta P)^N$, where Q is the flow rate, $\Delta P$ is the pressure differential and C and N are constants that can be measured in the laboratory for any particular nozzle. When a steady partial vacuum is maintained within the structure, the air flow through the projection is the same as the amount of air leaking into the structure. It is thus a simple operation to calculate the air leakage of the structure at any particular partial vacuum once the projection 13 has been calibrated so that the actual air flow for each pressure at the throat of the projection is known.

Electrical power for the motor 16 is provided by a lead 69 (see FIGS. 1 and 3) from a power source described more fully later. Additional leads 70, 73 are also provided for connection of the fan to a control unit (described later) so that the speed of the fan may be varied as required.

To create a partial vacuum within a structure, the panel 10 must be sealed within a doorway so that escape of air around the edges of the panel is substantially prevented. Since the apparatus is intended to be operable in virtually any building, an adjustable sealing arrangement has been devised to enable the panel to be sealed quickly and effectively in doorways of different sizes.

As shown in FIGS. 8-13, the sealing arrangement includes an adjustable frame 35. The frame has two fixed right angle corners 36, 37 and two adjustable right angle corners 38, 39. The adjustable corners allow the frame to be varied in width and height so that it can be fitted tightly into a doorway of any one of a variety of sizes.

Before the frame 35 is fitted into the doorway, draft-excluding strips 40 made of aluminum or the like are first attached by nails or screws to the door frame. These strips remain in place after the measurements have been made to form a draft-resisting seal with the original door, which does not have to be removed (see FIG. 11).

The frame 35 is fitted in the doorway and adjusted in size so that it fits snugly. The frame is then anchored to the strips 40 by at least four clamps 41. One of the clamps is shown most clearly in FIG. 9 and it can be seen that the clamp has an undercut forming a lip 42 which fits over the front surface of the draft excluding strip 40 (not shown in FIG. 9). Tightening of a nut 43 thus locks the frame against the strip.

The frame 35 is adjustable by virtue of the telescoped arrangement of tubular frame members at the adjustable corners 38, 39. The outer tubular frame members 44, 45 are capable of sliding longitudinally on inner frame members 46, 47 respectively. Slots 48, 49 are provided in the outer frame members for bolts 50, 51 attached to the inner frame members. Tightening of the bolts 50, 51 locks the frame against further adjustment when the frame has been correctly fitted to the size of the doorway. Slides 50 made of low friction plastic (e.g. TEFLON ®) or the like are provided between the inner members 46, 47 and outer members 44, 45 to facilitate adjustment of the frame size i.e., so that the outer members slide easily over the inner members.

Enlarged knurled knobs (not shown) may be used in place of bolts 43, 50, 51 to allow tightening and untightening of these locking arrangements by hand.

When the adjustable frame 35 has been installed in the doorway, the panel 10 is then clamped against the frame. A thin, flexible gasket (not shown) may be positioned between the panel 10 and frame 35 to form an effective seal. This gasket is preferably permanently mounted adjacent the periphery of the panel 10 forming an integral part of its structure. The clamping of the panel within the frame is achieved by means of four clamps 51, one of which is shown in detail in FIG. 11.

The clamp 51 has an operating lever 52 positioned on the inner (low pressure) surface 14 of the panel and a clamping arm 53 located on the outer (high pressure) surface 12 of the panel. The operating lever is movable between a clamping position (shown in solid lines in FIG. 13) and a released position (shown in broken lines) and such movement causes the clamping arm 53 to move similarly between a clamping position (solid lines) and a released position (broken lines). The operating lever 52 is connected to the clamping arm 53 by a linkage which extends through the panel. The linkage includes two rods 54, 55 pivotally attached at joint 56 to allow pivoting of rod 55 in a horizontal plane. Operating lever 52 is L-shaped and is pivotally mounted in a bracket 57 attached to the panel 10. The lever 52 divides into two symmetrical parts in the region adjacent the bracket 57 so that one end of rod 54 may be positioned therebetween and pivotally attached to the free end 59 of the lever 52.

As shown in the partial side elevational view of FIG. 11A, the arms of bracket 57 are themselves pivotable to a restricted extent about horizontal axes. This articulation enables rod 54 to maintain its orientation at right angles to panel 10 at all times while the operating lever 52 is moved between the clamping and released positions.

Rod 54 extends through a collar 60 located in a hole in the inner sheet 19 of the panel 10. The outer diameter of the rod 54 is only slightly smaller than the inner diameter of the collar 60 so that a sufficiently airtight seal is formed between the rod 54 and collar 60. Rod 54 has two parts, one part having an axial bore with an internal thread, and the other having an external thread dimensioned to be received within the bore. By adjusting the amount by which the externally threaded part is screwed into the externally threaded part before the clamp is fully assembled, the length of rod 54 and hence the clamping and released positions of clamping arm 53 can be changed to provide the most effective operation of the clamp.

The end of rod 55 opposite joint 56 is pivotally attached to the clamping arm 53. Rod 55 extends through hole 61 in sheet 20 of panel 10. Hole 61 is considerably larger than the diameter of rod 55 to allow for the necessary lateral movement of the rod as it moves from the released to the clamping positions and vice versa. As explained above, there is no need for an airtight seal at hole 61 because the outside air pressure sensor is located between sheets 19 and 20 so the air pressure between these sheets must be the same as the pressure outside the structure under test.

Clamping arm 53 is pivotally mounted in a bracket 62 attached to the outer surface 12 of the panel 10. The free end 63 of the clamping arm has an elongated slot 64 containing a slidably adjustable gripping element 65. The gripping element is advantageously made of rubber or other elastomer to allow it to be resiliently compressed against the frame 35. Adjustment of the gripping element 65 within slot 64 by loosening and retightening nut 66, allows the gripping element to be positioned at the optimum location on frame 35.

The clamps 51 have the advantages that, in the released position, the clamping arm 53 extends virtually at right angles to the panel 10 and thus does not interfere with the frame 35 when the panel is being mounted or dismounted. Further, the clamp can grip the frame firmly at any of the various height and width sizes that the frame can assume. Height variations of the frame clearly do not affect the operation of the clamp and width variations can be accommodated by suitably adjusting the position of the gripping element 65 in slot 64. Another significant advantage of the clamps is that the movement of the operating lever 52 is in a vertical plane despite the fact that the clamping arm 53 moves in a horizontal plane. This is significant because, if the operating lever were to move horizontally, projections at the side of the door frame (e.g. the door itself) could prevent the proper use of the clamps. In the clamping positions, the clamps are strong enough to resist any movement of the panel caused by its own weight or the difference in air pressure on the two faces of the panel produced during testing.

The panel may be provided with a support arrangement (not shown) at the bottom, e.g. vertically adjustable feet, so that the clamps 51 do not have to support the weight of the panel, but merely hold it securely against the frame.

FIG. 12 shows a transformer and control unit 67 used for supplying power to the fan motor 16, for controlling its operation and for carrying out the necessary calculations.

Electrical power for the fan 16 motor and control unit 67 is supplied by a portable generator (not shown) operated outside the structure. A 220 volt alternating current single phase, 60 cycle per second, 3700 volt-ampere gas powered generator has been found adequate. A lead from this generator is plugged into a socket 75 located on the high pressure side of panel 10 (see FIG. 13). This socket 75 is directly connected to similar socket 76 on the opposite (low pressure) side of the panel. In this way, electrical current can be introduced into the structure through panel 10 without causing air leaks, as the socket 76 is tightly sealed against any such possibility. A lead 69 plugged into socket 76 supplies the electrical current, e.g. provided at 220 volts AC, to a transformer/rectifier assembly located in lower part 68 of the control unit 67. The transformer transforms the voltage, for example, to 28 V and the rectifier converts the alternating current to direct current. This 28 V DC power is then supplied to the fan motor through leads 70 and 73 via control equipment located in the upper part 71 of the unit 67.

The use of a 28 V DC motor 16 for the fan has been found to be most efficient, although a 220 V AC motor could be employed, thus eliminating the need for a large transformer.

The control equipment is operated at a control panel 72 and one of the controls allows the speed of the fan to be varied so that different partial vacuum levels can be produced within the structure.

The upper and lower portions 68 and 71 may be separable with a quick-release connection between the two (not shown), so that the sensitive control panel 72 may be transported separately from the lower portion 68 containing the transformer. Further, the lower portion 68 may have a built-in trolley arrangement for further ease of transportation.

The equipment described above is normally used in the following manner.

The total heated volume of the building structure under test is determined manually by means of measurement of the external dimensions of the structure.

The panel 10 is sealed in a suitable doorway of the building structure under test by means of the adjustable frame 35. Leads 69, 70 and 73 are connected between unit 67 and the panel 10, and the connection is made with the generator outside. All other doors and windows of the structure are closed.

The fan 15 is then operated at a speed sufficient to produce an inside/outside pressure difference of, for example, 20 pascals. The pressure reading within the projection 13 is measured and the volume flow rate through the nozzle is calculated. The same operation is then carried out three times more at different fan speeds to produce inside/outside pressure differences of, for example, 25, 30 and 35 pascals.

Air flow through cracks in building structures can be represented by the equation $$Q = C(\Delta P)^N$$

wherein: Q is the flow rate in units of liters per second; C is the flow coefficient in units of liters per second per ΔP to the Nth power; ΔP is the pressure difference between the inside and the outside of the structure; and N is a dimensionless parameter typically between 0.5 and 1.0 which indicates the types of cracks that predominate the total area of air leakage of the structure.

The value N is actually the slope of the characteristic curve of the structure when plotted on log-log paper. When the air flow rate is plotted against the inside/outside pressure difference at a number of different pressures, the characteristic curve of the structure is a straight line on log-log paper.

Linear regression analysis (sometimes referred to as the method of least squares) is used to find the best line to fit the various points. The object of linear regression analysis is to fit a line through a number of points so that the sum of the squares of the distances of those points from the straight line is a minimum, where the distance is measured in a vertical direction. This can thus be used to find the best fit line which is therefore the characteristic curve of the structure.

All of these calculations can be performed with the assistance of a calculator (particularly a programmable calculator) or a computer. FIG. 12 shows a programmable calculator 73 and a printer 74 built into the control panel 72 where it is convenient for the operator's use. All measurements and calculations may alternatively be done totally automatically by micro-computer built into the control unit 67.

The above calculations not only make it possible to calculate a corrected air leakage rate at a standard inside/outside pressure difference expressed, if desired, in numbers of volume changes per hour, but the value of N also tells the operator what general type of leaks to look for, i.e. predominantly large or small.

The building structure, if found to be unsatisfactory in terms of air leakage, is then sealed using conventional caulking and weatherstripping techniques. The equipment may, however, be of assistance in detecting the leakage points by maintaining a reduced pressure inside the structure to increase the natural rate of infiltration of outside air into the building. The enhanced air leaks can then easily be detected by means of smoke pencils or hand-held anemometers and can be quickly sealed.

After the sealing operation has taken place, the measurements referred to above are repeated to find the new air leakage rate of the structure, and the difference between the original and new air leakage rates may be expressed as a percentage to clearly demonstrate the improvement brought about by the sealing operation.

The following is an actual example of readings taken and calculations performed with the above apparatus.

EXAMPLE 1

Heated Volume (Liters-Measured Manually): 204351

1st Measurement Before Sealing
House Pressure (pascals): 20
Nozzle Pressure (pascals): 650
Airflow Through Nozzle (Liters/Second): 364.3600402
2nd Measurement Before Sealing
House Pressure (pascals): 25
Nozzle Pressure (pascals): 950
Airflow Through Nozzle (Liters/Second): 439.7716019
3rd Measurement Before Sealing
House Pressure (pascals): 30

Nozzle Pressure (pascals): 1163
Airflow Through Nozzle (Liters/Second): 486.1580205
4th Measurement Before Sealing
House Pressure (pascals): 43
Nozzle Pressure (pascals): 1800
Airflow Through Nozzle (Liters/Second): 603.6819229
Correlation coefficient of linear regression: 0.99581883
Changes of air per hour before sealing: 11.84585609
The structure was then sealed using conventional caulking and weatherstripping etc.
1st Measurement After Sealing
House Pressure (pascals): 27
Nozzle Pressure (pascals): 250
Airflow Through Nozzle (Liters/Second): 226.8968427
2nd Measurement After Sealing
House Pressure (pascals): 35
Nozzle Pressure (pascals): 338
Airflow Through Nozzle (Liters/Second): 263.4836061
3rd Measurement After Sealing
House Pressure (pascals): 48
Nozzle Pressure (pascals): 488
Airflow Through Nozzle (Liters/Second): 316.0962155
4th Measurement After Sealing
House Pressure (pascals): 55
Nozzle Pressure (pascals): 563
Airflow Through Nozzle (Liters/Second): 339.3099551
Correlation coefficient of linear regression: 0.9998827627
Changes of air per hour after sealing: 5.679825716
Percentage reduction in air leakage: 52%

For even greater accuracy, it is preferable to carry out the present invention in such a manner that the effects of variations in temperature and barometric pressure are taken into account when calculating air leakage rates. This can be achieved as follows.

Firstly the heated volume of the structure (preferably in cubic meters), the gross exposed surface area (square meters), the inside temperature (°C.) and the prevailing barometric pressure (kilopascals) are determined by conventional means and recorded.

The fan is then operated and its speed is increased until a maximum negative pressure differential is established. This pressure differential is recorded, as is the corresponding pressure differential at the nozzle 13. The fan speed is then reduced until a new pressure differential is established inside the structure and this pressure, along with the corresponding nozzle pressure, is recorded. This procedure is repeated until at least four sets of readings have been obtained.

The nozzle pressure at any time is indicative of the air flow rate through the nozzle, as stated earlier, but to account for the fact that air has different densities (and therefore slightly different air flow rates) at different temperatures and barometric pressures, the measured flow rates can be converted to standard conditions by the equation:

$$Q = Qm \left(\frac{294}{273 + T}\right)\left(\frac{B}{101.3}\right)$$

where:
Q = corrected air flow rate (liters/second)
Qm = measured air flow rate (liters/second)
T = inside air temperature (°C.)
B = barometric pressure (kilopascals)

The characteristic curves mentioned earlier can then be plotted using the corrected flow rates obtained in this way.

As noted above, the characteristic curve is a relationship of the form $Q = C(\Delta P)^N$. When corresponding values of Q and P are plotted on log-log graph paper, the data fall along a straight line (perhaps requiring linear regression analysis). The slope of the straight line gives the value of N and the constant C is equal to the value of Q when $\Delta P$ is equal to 1. Each structure has a particular characteristic curve at a given degree of air tightness. A new characteristic curve is obtained after extra caulking and weatherstripping has been installed.

The use of linear regression analysis enables a best straight line to be drawn through any collection of points, but preferably some caution should be employed in using this approximation because a substantial variation in the position of the points from a straight line indicates that there are errors in the testing method or equipment. Correlation coefficients less than about 0.98 should therefore preferably be rejected and the testing procedures repeated.

Once an acceptable straight line has been drawn, values for the constants C and N can be obtained.

One way of presenting the results in a meaningful way is to calculate the equivalent leakage area (ELA), e.g. expressed in square meters, by substituting the determined value of C and N into the following formula:

$$ELA = 1.157\sqrt{\rho} C^{N-0.5}$$

where $\rho$ = the density of the air (kilograms per cubic meter).

The rate of complete air changes at a standard pressure differential can also be calculated. At 50 pascals pressure differential, this can be calculated as follows:

$$ACH_{50} = \frac{Q_{50} \times 3600}{V}$$

where
$ACH_{50}$ = the number of air changes per hour at a 50 pascal pressure differential
$Q_{50}$ = the air flow rate through the nozzle at said pressure differential
V = heated volume (cubic meters)

The air flow rate at other pressure differentials can be calculated in the same way using the value of Q at that pressure differential.

The results can also be expressed as relative tightness (RT) expressed in millimeters per second according to the following equation:

$$RT = \frac{Q_{10} \times 1000}{A}$$

where
$Q_{10}$ = the air flow rate at a 10 pascal pressure differential (cubic meters per second)
A = exposed surface area (square meters)

Finally, if desired, the effectiveness of the caulking and weatherstripping operation can be shown most graphically by calculating the equivalent leakage area (ELA) before and after this operation and determining the percentage reduction by $$\% \text{ reduction} = \frac{ELA_b - ELA_a}{EKA_b} \times 100$$

where
ELA$_a$=equivalent leakage area before sealing
ELA$_b$=equivalent leakage area after sealing
The following Example shows the results of tests on a house according to the above procedure.

EXAMPLE 2

The nozzle 3 of the test equipment was found, according to laboratory tests, to have a value of C of 17.22 and a value of N of 0.488245.
Heated volume (liters—measured manually): 403
Gross exposed surface area (square meters—measured manually): 194
Temperature: 22° C.
Pressure (kilopascals): 101
 1st Measurement before sealing
 House pressure (pascals): 50
 Nozzle pressure (pascals): 2430
 Corrected airflow through nozzle (liters/second): 769.6489001
 2nd Measurement before sealing
 House pressure (pascals): 40
 Nozzle pressure (pascals): 1830
 Corrected airflow through nozzle (liters/second): 670.1347432
 3rd Measurement before sealing
 House pressure (pascals): 30
 Nozzle pressure (pascals): 1300
 Corrected airflow through nozzle (liters/second): 567.0916227
 4th Measurement before sealing
 House pressure (pascals): 20
 Nozzle pressure (pascals): 730
 Corrected airflow through nozzle (liters/second): 427.8462959
 5th Measurement before sealing
 House pressure (pascals): 10
 Nozzle pressure (pascals): 340
 Corrected airflow through nozzle (liters/second): 294.6218629
 Calculated values
 Correlation coefficient: 0.9989817978
 C: 0.0726606094
 N: 0.6017878961
 ELA: 0.1208740743
 ACH$_{50}$: 6.83464678
 ACH$_4$: 1.494888861
 RT: 1.497218559
 1st Measurement after sealing
 House pressure (pascals): 65
 Nozzle pressure (pascals): 1450
 Corrected airflow through nozzle (liters/second): 598.1475346
 2nd Measurement after sealing
 House pressure (pascals): 60
 Nozzle pressure (pascals): 1260
 Corrected airflow through nozzle (liters/second): 558.5040267
 3rd Measurement after sealing
 House pressure (pascals): 55
 Nozzle pressure (pascals): 1160
 Corrected airflow through nozzle (liters/second): 536.4039944
 4th Measurement after sealing
 House pressure (pascals): 50
 Nozzle pressure (pascals): 1000
 Corrected airflow through nozzle (liters/second): 498.9079105
 5th Measurement after sealing
 House pressure (pascals): 45
 Nozzle pressure (pascals): 830
 Corrected airflow through nozzle (liters/second): 455.5229565
 6th Measurement after sealing
 House pressure (pascals): 40
 Nozzle pressure (pascals): 760
 Corrected airflow through nozzle (liters/second): 436.3426114
 7th Measurement after sealing
 House pressure (pascals): 35
 Nozzle pressure (pascals): 650
 Corrected airflow through nozzle (liters/second): 404.2735577
 8th Measurement after sealing
 House pressure (pascals): 30
 Nozzle pressure (pascals): 520
 Corrected airflow through nozzle (liters/second): 362.5425812
 9th Measurement after sealing
 House pressure (pascals): 25
 Nozzle pressure (pascals): 420
 Corrected airflow through nozzle (liters/second): 326.6418721
 10th Measurement after sealing
 House pressure (pascals): 20
 Nozzle pressure (pascals): 310
 Corrected airflow through nozzle (liters/second): 281.629236
 11th Measurement after sealing
 House pressure (pascals): 15
 Nozzle pressure (pascals): 220
 Corrected airflow through nozzle (liters/second): 238.2090537
 12th Measurement after sealing
 House pressure (pascals): 10
 Nozzle pressure (pascals): 130
 Corrected airflow through nozzle (liters/second): 184.2481907
 Calculated values
 Correlation coefficient: 0.9995360705
 C: 0.0439948457
 N: 0.6215519892
 ELA: 0.0765949289
 ACH$_{50}$: 4.470925565
 ACH$_4$: 0.9302739053
 RT: 0.9487505886
Percentage reduction in ELA: 36.63245872%

The above equipment is designed to fit into a doorway of a building, but of course other embodiments may be dimensioned to fit into window frames or other suitable openings usually provided in the structures under test. Furthermore, other modifications that would be obvious to a person skilled in this art after reading the above disclosure are included within the scope of the invention as defined by the following claims.

We claim:
1. In a method of determining the rate of air leakage into an enclosed structure and which includes the steps of:

continuously evacuating air from said structure by an air evacuation means at a determined air outflow rate;

continuing said evacuation of air from said structure and permitting the pressure within the structure to stabilize;

measuring the pressure differential between the interior of said structure and exterior thereto after stabilization of said pressure; and, continuing said evacuation of air from said structure and then measuring the air outflow rate produced by said pressure stabilization;

the improvement comprising;

evacuating air from said structure through a calibrated long radius nozzle having a throat of fixed dimensions spaced upstream of said evacuation means, obtaining a measurement of the air outflow rate through said throat as expressed by the nozzle pressure in a multiple tap, static pressure averaging arrangement connecting with a sealed space defined by inner and outer walls of said long radius nozzle and connected with said throat; and, determining from the measured information the air leakage characteristics of said structure.

2. The method of claim 1, further including determining the air leakage rate into said structure by the formula:

$$Q = C(\Delta P)^N$$

wherein: Q is the flow rate through said nozzle in units of liters per second; C is the flow coefficient in the units of liters per second per pascal to the Nth power; ΔP is the pressure difference between the inside and the outside of the structure; and N is a dimensionless parameter typically between 0.5 and 1.0 which indicates the types of cracks that predominate the area of air leakage of the structure.

3. In a method of determining the rate of air leakage into an enclosed structure and which includes the steps of:

continuously evacuating air from said structure by an air evacuation means at a determined first air outflow rate;

continuing said evacuation of air from said structure and permitting the pressure within the structure to stabilize;

measuring the pressure differential between the interior of said structure and exterior thereto after stabilization of said pressure; and continuing said evacuation of air from said structure and measuring the air outflow rate produced by said evacuation means subsequent to said pressure stabilization at said first determined evacuation rate:

the improvement comprising;

evacuating air from said structure at said first determined pressure differential through a calibrated long radius nozzle having a throat of fixed dimensions spaced upstream of said evacuation means, and then progressively evacuating air from said structure through said nozzle at different determined pressure differentials from said first determined pressure differential;

continuing said evacuation of air from said structure at each said pressure differential and permitting the pressure within the structure to stabilize at each said different determined pressure differential;

measuring the pressure differential between the interior of said structure and exterior thereto after stabilization of said pressure:

continuing said evacuation of air from said structure at each said different determined pressure differential and then obtaining a measurement of the air outflow rate through said throat at each said different determined pressure differential and subsequent to said pressure stabilization, as expressed by the nozzle pressure in a multiple tap, static pressure averaging arrangement connecting to a sealed space defined by inner and outer walls of said long radius nozzle and connected with said throat; and, determining the air leakage characteristics of the structure, including a determination of the average infiltration rate of the said structure.

4. The method of claim 3, in which said air leakage rate into the structure at each determined evacuation rate is determined by the formula:

$$Q = C(\Delta P)^N$$

wherein: Q is the flow rate through said nozzle in units of liters per second; C is the flow coefficient in units of liters per second per pascal to the Nth power; ΔP is the pressure difference between the inside and the outside of the structure; and N is a dimensionless parameter typically between 0.5 and 1.0 which indicates the types of cracks that predominate the area of air leakage of the structure.

5. Apparatus for use in measuring the air leakage rate into a structure, comprising:

panel means detachably attachable within an opening in said structure in hermetically sealed relation therewith;

duct means rigidly associated with and supported by said panel, said duct means extending through said panel in hermetically sealed relation with said panel;

evacuation means positioned within said duct means;

calibrated long radius nozzle means detachably attachable to said duct means positionable within said structure, said nozzle means providing an orifice of fixed dimensions; and, a multiple tap, static pressure averaging arrangement connecting to a sealed space defined by inner and outer walls of said long radius nozzle and connected with said throat for measuring the air flow rate through said fixed orifice nozzle, said multiple tap, static pressure averaging arrangement connecting with said throat at a position spaced upstream of said evacuation means and thus remote from turbulence, eddies or other air disturbances produced by the operation of said evacuation means.

6. The apparatus of claim 5, further including adjustable frame means positionable within said opening in said structure and including sealing members carried by said adjustable frame means for hermetic sealing of said frame means within the confines of said opening; and, means detachably attaching said panel means to said adjustable frame means in hermetically sealed relation therewith.

7. The apparatus of claim 6, further including quick-release means associated with said panel member and said duct means, whereby said panel member can be readily detachably attached to said adjustable frame means, and said fixed orifice nozzle can be readily detachably attached to said duct means.

8. The apparatus of claim 6, in which said adjustable frame means and said panel are both generally rectangular.

9. The apparatus of claim 6, in which said adjustable frame means has two fixed corners and two adjustable corners, each of said adjustable corners having telescoping tubular parts permitting expansion or contraction of the frame in the vertical and horizontal directions.

10. The apparatus of claim 6, including a plurality of clamp means carried by said panel, each said clamp means having an operating member on one side of the panel and a clamping member on the opposite side of the panel, said clamp means being operative to attach and compress said panel against said adjustable frame means.

11. The apparatus of claim 10, wherein each said operating member moves in one plane, and each said clamping member moves in a second plane at right angles thereto.

12. The apparatus of claim 10, in which each clamp comprises:
an arcuate arm pivotally attached at one end to the said opposite side of the panel forming said clamping member;
an L-shaped member, forming said operating member, pivotally attached to said one side of the panel at the point where the two arms of the L meet; and,
linkage means between the two members so that movement of the operating member between first and second positions produces rotation of said clamping member between first and second positions.

13. The apparatus of claim 12, in which each said linkage means comprises:
a rod attached at one end to a free end of said L-shaped lever and extending through said panel via a substantially air-tight collar; and,
a second rod attached at one end to said flexible rod and pivotively attached at the other end to said arcuate member at a point intermediate its ends.

14. The apparatus of claim 5, in which said evacuation means is a drive motor rigidly supported within said duct means in spaced relation therewith, said drive motor having a drive shaft axially aligned with said duct means and carrying an air impeller to be driven by said motor, said drive motor being supported by members extending radially of said motor and axially of said duct means.

15. The apparatus of claim 6, in which said adjustable frame means and said panel are both generally rectangular.

16. The apparatus of claim 5, in which said nozzle means is defined by an elongate tubular member having an internal shape configured to produce substantially stable, laminar flow at least at the inlet thereto and in the location of said multiple tap, static pressure averaging arrangement.

17. The apparatus of claim 5, in which said nozzle means is comprised of an elongate tubular member having a flared end defining a narrowing in the passageway adjacent said flared end, said multiple tap, static pressure averaging arrangement being located in the vicinity of said narrowing of the passageway.

18. The apparatus of claim 17, in which said multiple tap, static pressure averaging arrangement connects to a sealed space defined by the inner and outer walls of the elongate tubular member through apertures in said inner wall communicating with said narrowing of the passageway.

19. The apparatus of claim 5, further including means for measuring the difference in pressure inside and outside of said structure.

20. The apparatus of claim 5, further including means for automatically measuring the difference in pressure between the inside and outside of the structure, means for automatically measuring the pressure at said narrowing of the passageway, and calculating means for automatically calculating the air leakage rate of said structure based on said pressure measurements.

* * * * *